(12) United States Patent
Dahlen et al.

(10) Patent No.: US 6,178,421 B1
(45) Date of Patent: *Jan. 23, 2001

(54) METHOD OF PERFORMING PARALLEL CLEANUP OF SEGMENTS OF A LOCK STRUCTURE

(75) Inventors: Dennis J. Dahlen, Rhinebeck; Jeffrey Mark Nick, Fishkill; David Harold Surman, Milton; Douglas W. Westcott, Rhinebeck, all of NY (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/092,170

(22) Filed: Jun. 5, 1998

(51) Int. Cl.[7] ................................................ G06F 12/14
(52) U.S. Cl. .............................. 707/8; 709/400; 711/150; 710/200
(58) Field of Search ................................. 707/8; 709/400; 711/150, 152, 163; 710/200

(56) References Cited

U.S. PATENT DOCUMENTS

| 5,175,837 | * 12/1992 | Arnold et al. ........................ 711/152 |
| 5,274,809 | 12/1993 | Iwasaki et al. . |
| 5,295,262 | 3/1994 | Seigh, II . |
| 5,317,739 | 5/1994 | Elko et al. . |
| 5,339,427 | 8/1994 | Elko et al. . |
| 5,394,542 | 2/1995 | Frey et al. . |
| 5,463,736 | 10/1995 | Elko et al. . |
| 5,465,359 | 11/1995 | Allen et al. . |
| 5,502,840 | 3/1996 | Barton . |
| 5,515,538 | 5/1996 | Kleiman . |
| 5,553,267 | 9/1996 | Herlihy . |
| 5,561,809 | 10/1996 | Elko et al. . |
| 5,566,319 | * 10/1996 | Lenz ..................................... 711/147 |
| 5,634,072 | 5/1997 | Allen et al. . |
| 5,706,432 | 1/1998 | Elko et al. . |
| 5,832,484 | * 11/1998 | Sankaran et al. ........................ 707/8 |

* cited by examiner

Primary Examiner—William M. Treat
(74) Attorney, Agent, or Firm—Lawrence D. Cutter, Esq.; William A. Kinnaman, Jr., Esq.; Heslin & Rothenberg, P.C.

(57) ABSTRACT

A lock structure, which includes many entries, is partitioned into segments. A number of the segments are cleaned up in parallel, such that cleanup processing of the entire lock structure is optimized. The lock structure is maintained within a coupling facility, which provides access to the lock structure by one or more processors coupled to the coupling facility. The cleaning up of the lock structure is performed by commands driven by the one or more processors and executed within the coupling facility.

16 Claims, 8 Drawing Sheets

| SEGMENT # | STARTING LTEN |
|---|---|
| 1 | 1 |
| 2 | 62,501 |
| ... | ... |
| 16 | 937,501 | fig. 8A

| SEGMENT # | ENDING LTEN |
|---|---|
| 1 | 62,500 |
| 2 | 125,000 |
| ... | ... |
| 16 | 1,000,000 | fig. 8B

METHOD OF PERFORMING PARALLEL CLEANUP OF SEGMENTS OF A LOCK STRUCTURE

TECHNICAL FIELD

This invention relates, in general, to parallel processing and, in particular, to performing parallel cleanup of segments of a lock structure in order to optimize the cleanup process.

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"SYSTEM OF PERFORMING PARALLEL CLEANUP OF SEGMENTS OF A LOCK STRUCTURE," by Dahlen et al., Ser. No. 09/092,420; and "PERFORMING PARALLEL CLEANUP OF SEGMENTS OF A LOCK STRUCTURE," by Dahlen et al., Ser. No. 09/092,360.

BACKGROUND ART

Data processing systems have long used locking mechanisms as a means for ensuring data integrity during, for instance, write and update operations. These locking mechanisms typically include locks, which are used to associate state information with the name of a resource to be locked. The state information indicates accessing privileges (e.g., shared, exclusive), ownership, etc.

One example of a system using locks to ensure data integrity is a Parallel Sysplex™ configuration offered by International Business Machines Corporation. The Parallel Sysplex™ configuration conforms to the S/390® architecture described, for example, in the IBM publication *Enterprise Systems Architecture/390 Principles of Operation*, SA22-7201-04, June 1997, which is hereby incorporated herein by reference in its entirety.

The IBM Parallel Sysplex configuration includes two or more processors interconnected via a coupling facility to form what is known as a "sysplex" (system complex). The coupling facility contains storage accessible by the processors, performs operations requested by programs in the processors and enables the sharing of data by the processors coupled thereto. The data are stored in storage structures, such as cache structures and/or list structures. In one example, the list structures include locking structures, such as lock tables. The lock tables include the locks used to ensure data integrity during write and update operations.

When a user of a coupling facility lock structure (e.g., a lock table within a list structure) terminates or disconnects while holding locks in the coupling facility, a cleanup process is used to cleanup the locks held by the terminated or disconnected user. This cleanup process is performed by all of the surviving users of the lock structure.

The current process for cleaning up the lock table, by each surviving user, includes using a coupling facility command to search through the lock table entries in ascending order until a lock table entry indicating a lock held by the disconnected or terminated user is found. When such an entry is found, the coupling facility returns the lock table entry number for which cleanup is needed and the contents of that lock table entry. This command may time-out and need to be redriven multiple times. When the command times-out, it returns the lock table entry number of the first lock table entry that has not yet been scanned. When a lock held by the terminated or disconnected user is found, a different coupling facility command is used to free the lock held by the terminated or disconnected user. This procedure continues until the entire lock table has been scanned and cleaned up by each and every surviving user. The process of cleaning up the locks held by the terminated or disconnected user can take a minute or more, since the lock table, typically, contains millions of locks.

While the cleaning up process is being performed, the lock structure is in a quiesced state, such that lock requests against the structure from the surviving users cannot be processed and lock requesters are made to wait. The data protected by the locks is therefore unavailable to the surviving users for the duration of the cleanup. Many customer applications have response time goals for the transactions they process, and these goals may not be achievable because of the long duration of the cleanup process. The customer perception of this is that failure of a user causes a temporary case of sysplex-wide sympathy sickness during which data is not avail able and response time go also are not met.

The above-described cleanup process may result in a significant amount of redundant scanning, because the lock table is scanned by each surviving user to ensure coverage of the cleanup by some user. Furthermore, its one-entry-at-a-time approach to cleanup processing may result in a huge number of coupling facility commands being performed. This is due to the fact that every time a matching lock table entry is returned, two coupling facility commands are performed: one to free the lock that was found to be held by the terminated or disconnected user, and another to restart the scan process starting with the next entry. Thus, the overhead of a large number of coupling facility commands slows the overall cleanup process down significantly.

Based on the foregoing, a need exists for a cleanup process capability that does not require each surviving user to scan the entire lock table. In addition, a cleanup process capability is needed that requires significantly fewer coupling facility accesses. A further need exists for a cleanup capability that reduces the response time impact that is visible to customers and to applications. A yet further need exists for a cleanup capability that enhances system performance.

SUMMARY OF THE INVENTION

The shortcomings of the prior art are overcome and additional advantages are provided through the provision of a method of processing lock structures. The method includes, for instance, partitioning the lock structure into a plurality of segments. The plurality of segments include a plurality of entries, and the plurality of entries include a plurality of locks. The method further includes processing multiple segments of the plurality of segments in parallel.

In one embodiment of the invention, the lock structure is located within a coupling facility and is shared by one or more processors coupled to the coupling facility.

In another embodiment, the partitioning is performed by a command issued on behalf of a user of one of the processors coupled to the coupling facility, and the command is executed within the coupling facility.

In another embodiment of the invention, the processing, for a segment of the multiple segments, includes scanning entries of the segment to determine whether any locks are held by a terminated user of the lock structure, and cleaning up one or more of the locks determined to be held by the terminated user.

In one example, the cleaning up includes setting one or more exclusive locks held for the terminated user to zero, and/or setting one or more shared locks corresponding to the terminated user to zero.

In one embodiment, one command is used to perform the scanning and the cleaning up. In another example, the method includes determining whether the command has timed-out during the scanning or cleaning up. If the command has timed-out and entries of the segment or other segments of the lock structure still need to be cleaned up, the command is redriven.

In another aspect of the invention, a method of processing lock structures is provided. The method includes partitioning a lock structure into a plurality of segments; scanning one or more of the segments to locate at least one lock of the lock structure to be cleaned up, wherein the scanning uses one or more cleanup commands; and cleaning up the at least one lock. The cleaning up is performed by the same one or more cleanup commands that located the at least one lock during the scanning.

In another embodiment, a method of processing lock structures is provided. The method includes scanning one or more segments of a lock structure partitioned into a plurality of segments to determine whether one or more locks of the lock structure is held by a terminated user; and determining whether any of the one or more locks is to be cleaned up, when the scanning determines the one or more locks is held by the terminated user.

The cleanup processing capability of the present invention advantageously parallelizes the cleanup process, significantly improves system availability and enhances system performance. The cleanup processing capability of the present invention eliminates redundant cleanup processing performed by multiple surviving users, requires significantly fewer coupling facility accesses to perform cleanup, and substantially reduces the amount of time spent performing lock table cleanup processing.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIGS. 8a–8b depict examples of arrays used during cleanup processing of the present invention.

BEST MODE FOR CARRYING OUT THE INVENTION

In accordance with the principles of the present invention, a lock structure parallel cleanup capability is provided. The lock structure is partitioned into a number of segments, and a plurality of those segments are cleaned up in parallel. The segments are cleaned up using commands that are issued on behalf of users of the lock structure. The commands are executed by a coupling facility containing the lock structure.

Figure 1:
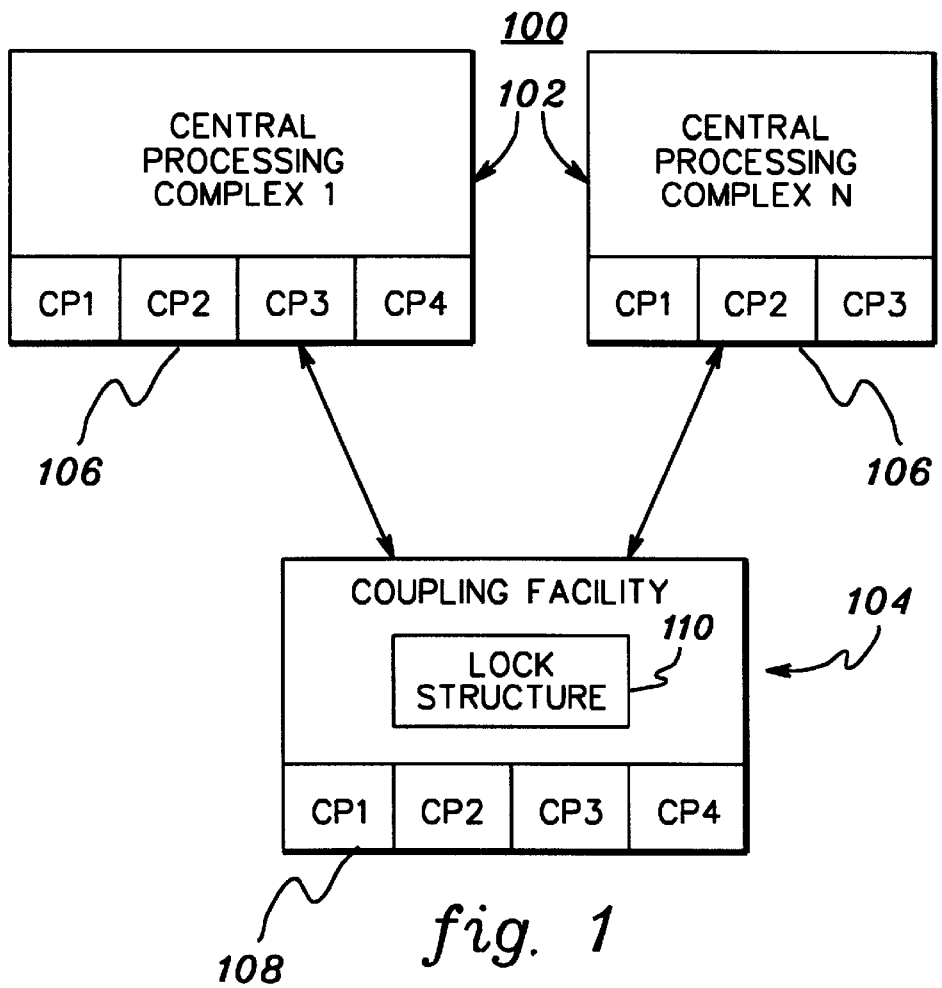
FIG. 1 depicts one example of a computing environment incorporating and using the cleanup processing capability of the present invention.

One embodiment of a computing environment incorporating and using the cleanup facility of the present invention is depicted in FIG. 1 and described below. In one example, a computing environment 100 is based on the Enterprise Systems Architecture (ESA)/390 offered by International Business Machines Corporation, as described, for example, in the IBM Publication *Enterprise Systems Architecture/390 Principles of Operation*, SA22-7201-04, June 1997, hereby incorporated herein by reference in its entirety.

Computing environment 100 includes, for instance, one or more central processing complexes (CPCs) 102 coupled to at least one coupling facility 104, each of which is described below.

Each central processing complex 102 includes one or more central processors 106 (central processing units), each of which may execute an operating system. Exemplary operating systems include the OS/390™ and MVS/ESA™ operating systems offered by International Business Machines Corporation.

Coupling facility 104 is a sharable facility that contains storage accessible by the processors of each of the central processing complexes coupled thereto, and performs operations requested by the processors. In one embodiment, coupling facility 104 is a structured-external storage processor (SES). Coupling facility functions are implemented by coupling facility control code that is executed by one or more processors 108 of the coupling facility.

Examples of a coupling facility are described in detail in U.S. Pat. No. 5,317,739, entitled "Method And Apparatus For Coupling Data Processing Systems," Elko et al., issued May 31, 1994; U.S. Pat. No. 5,394,542, entitled "Clearing Data Objects Used To Maintain State Information For Shared Data At A Local Complex When At Least One Message Path To The Local Complex Cannot Be Recovered," Frey et al., issued Feb. 28, 1995; U.S. Pat. No. 5,463,736, entitled "Coupling Facility For Receiving Commands From Plurality of Hosts For Activating Selected Connection Paths To I/O Devices And Maintaining Status Thereof," Elko et al., issued Oct. 31, 1995; U.S. Pat. No. 5,465,359, entitled "Method And System For Managing Data And Users Of Data In A Data Processing System," Allen et al., issued Nov. 07, 1995; U.S. Pat. No. 5,634,072, entitled "Method Of Managing Resources In One Or More Coupling Facilities Coupled To One Or More Operating Systems In One Or More Central Programming Complexes Using A Policy," Allen et al., issued May 27, 1997; U.S. Pat. No. 5,561,809, entitled "In A Multiprocessing System Having A Coupling Facility, Communicating Messages Between The Processors And The Coupling Facility In Either A Synchronous Operation Or An Asynchronous Operation", Elko et al, issued on Oct. 01, 1996; and U.S. Pat. No. 5,706,432, entitled "Mechanism For Receiving Messages At A Coupling Facility", Elko et al., issued on Jan. 06, 1998, each of which is hereby incorporated herein by reference in its entirety, along with any applications, patents and references cited therein.

In accordance with the principles of the present invention, coupling facility 104 includes a lock structure 110, such as, for instance, a lock table. One example of a lock table and the commands associated therewith are described in detail in U.S. Pat. No. 5,339,427, entitled "Method and Apparatus For Distributed Locking of Shared Data, Employing A Central Coupling Facility", Elko et al., issued on Aug. 16, 1994, which is hereby incorporated herein by reference in its entirety.

Figure 2:
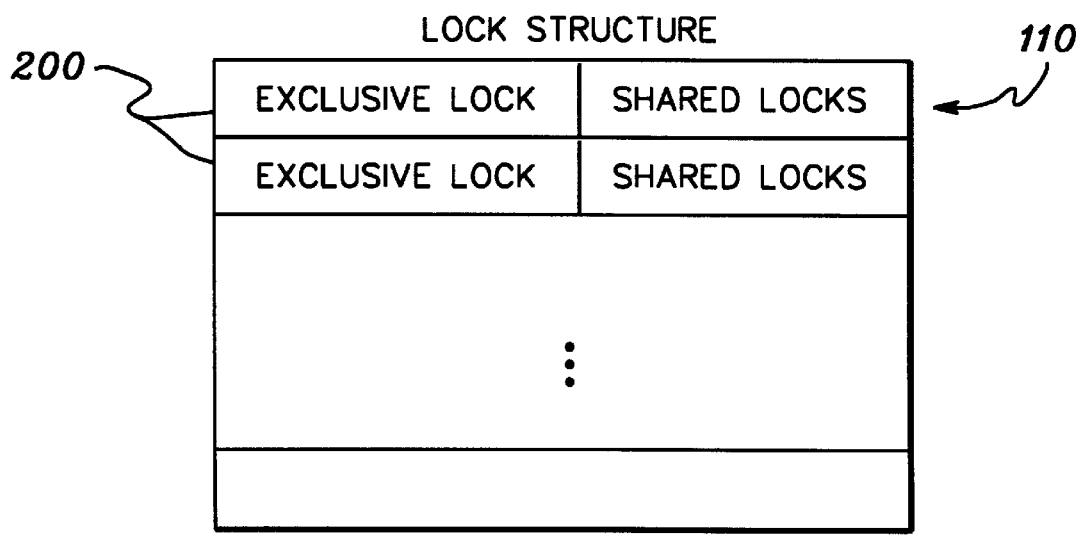
FIG. 2 depicts one example of a lock structure to be cleaned up, in accordance with the principles of the present invention.

In one embodiment, lock structure 110 (e.g., a lock table) includes a sequence of objects, referred to as lock table entries 200 (FIG. 2). Each entry 200 is associated with a particular resource to be locked, and includes, for example, an exclusive lock byte (also referred to as a global lock manager) for the resource, and one or more shared lock bits (also referred to as local lock managers) for the resource.

Figure 3A:
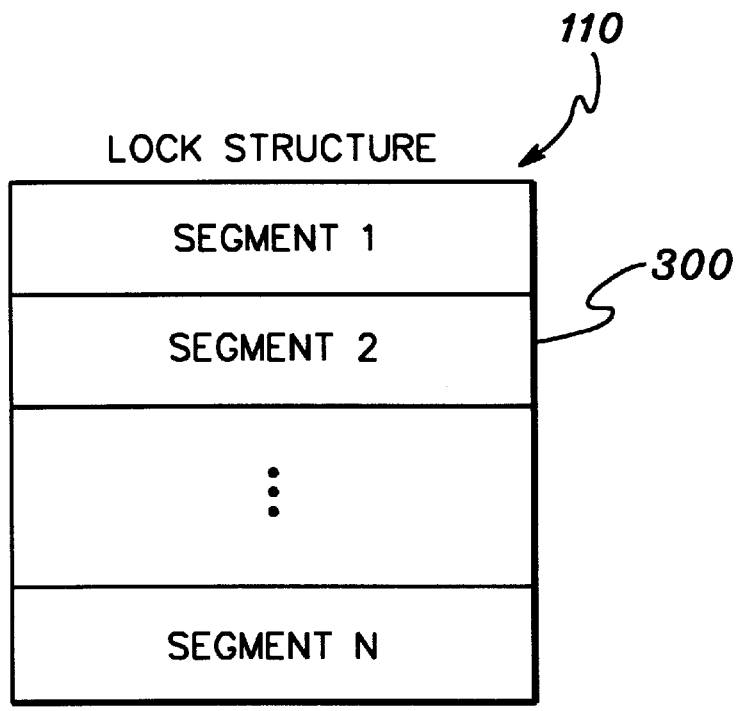
FIG. 3a depicts one example of a lock structure partitioned into a number of segments, in accordance with the principles of the present invention.
Figure 3B:
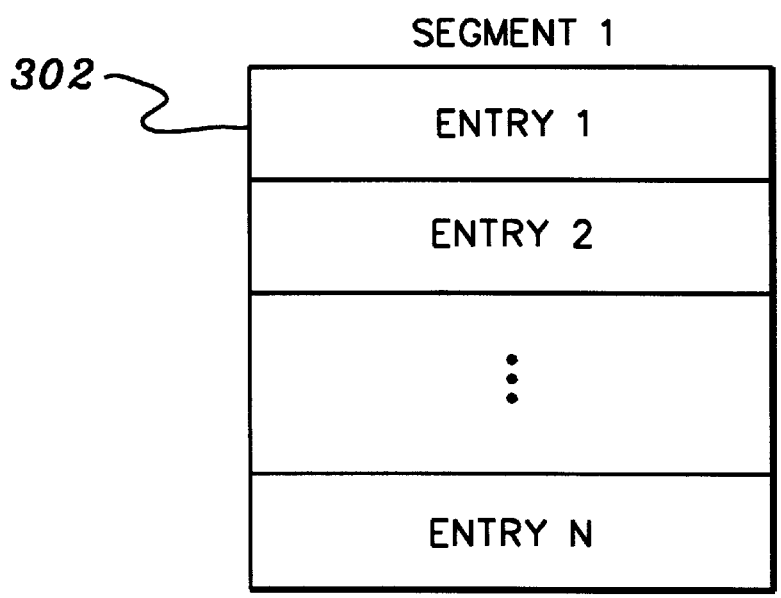
FIG. 3b depicts one example of a plurality of entries of one segment of the lock structure of FIG. 3a, in accordance with the principles of the present invention.

A lock structure can be very large, including, for instance, millions of lock table entries. Thus, in accordance with the principles of the present invention, the lock structure is partitioned into a plurality of segments 300 (FIG. 3a) (e.g., 16 segments), and each segment includes a plurality of entries 302 (FIG. 3b). For example, if lock structure 110 includes one million entries, and the structure is partitioned into 16 segments, then each segment includes 62,500 entries. Each entry includes, for example, an exclusive lock for the resource represented by the entry and one or more shared locks. (In another example, each entry includes an exclusive lock and no shared locks.)

In accordance with the principles of the present invention, when a user of the lock structure terminates or disconnects while holding locks in the lock structure, a technique is used to cleanup the locks held by the terminated or disconnected user. (The further use of the word "terminate" herein includes one or more of terminate, disconnect, fail and end.) One embodiment of this technique is described in detail with reference to FIGS. 4–9.

Figure 4:
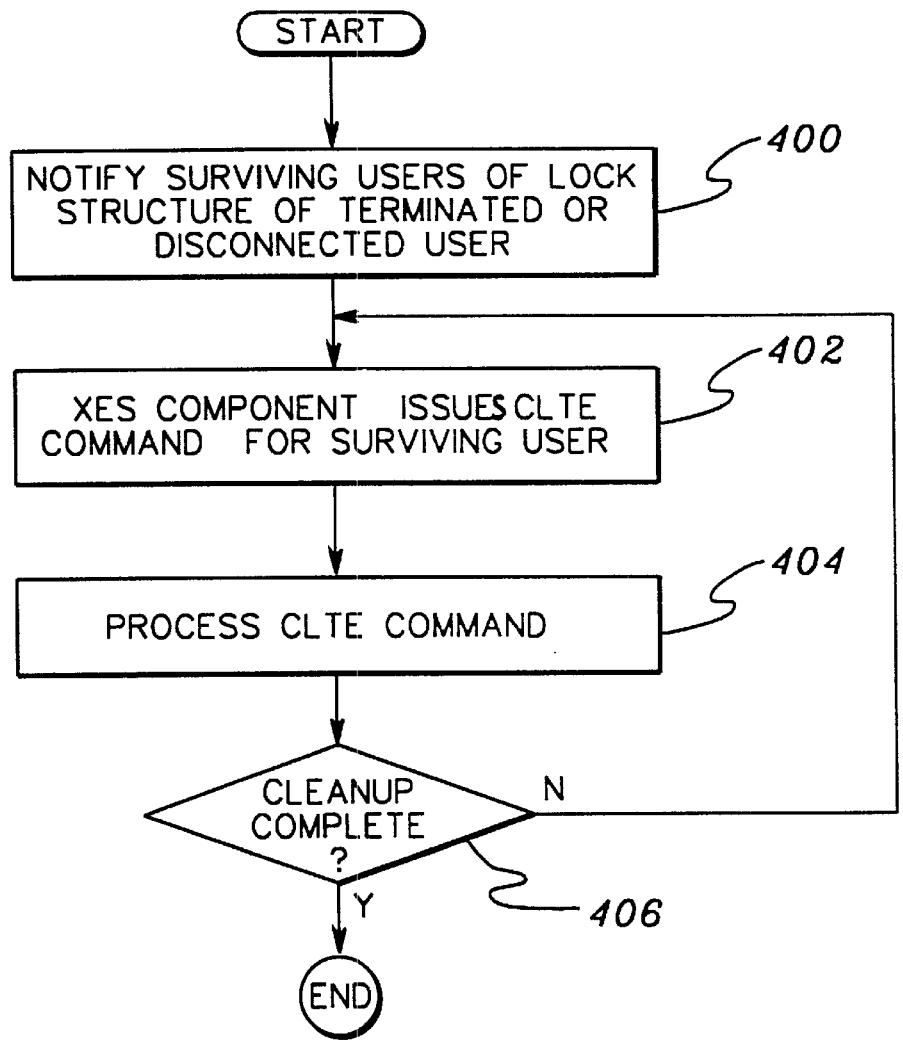
FIG. 4 depicts one embodiment of an overview of the logic associated with the cleanup processing capability of the present invention.

When a user of the lock structure terminates, the surviving users of the lock structure are notified so that the surviving users can participate in cleanup of the locks held by the terminated user, STEP 400 (FIG. 4). In one example, it is the operating systems on the processors coupled to the coupling facility that drive the cleanup process for the surviving users. In particular, when the operating systems are OS/390 or MVS/ESA, it is the Cross-System Extended Services (XES) component of each operating system that coordinates the process and involves the participation of the surviving users.

Figure 5:
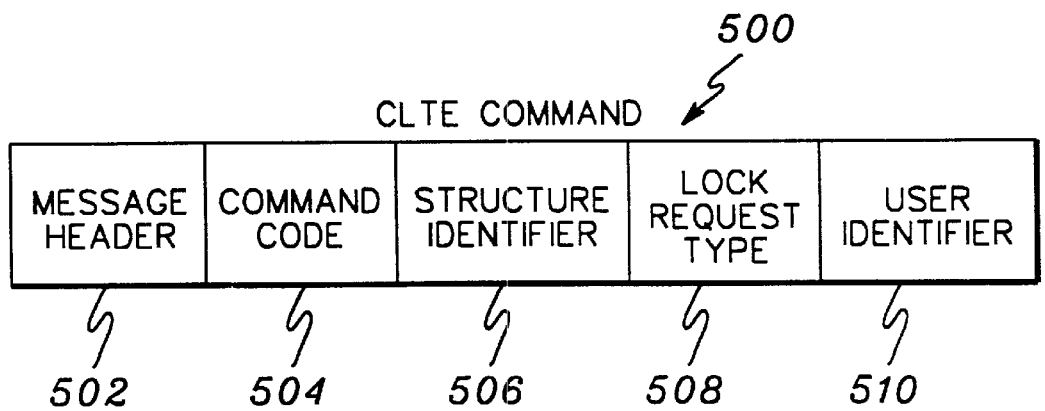
FIG. 5 depicts one embodiment of a Cleanup Lock Table Entries (CLTE) command used in accordance with the principles of the present invention.

For example, XES drives an exit routine for each of the surviving users, which tells the surviving users when a user terminates. In response to the exit, the surviving users may do their own level of recovery. When each surviving user finishes any recovery it wishes to perform, it notifies XES that its recovery is complete. When all of the surviving users have notified XES of completion, XES goes into action with cleanup support. In particular, a XES component issues a Cleanup Lock Table Entries (CLTE) command for a surviving user in order to cleanup the lock structure for the terminated user, STEP 402. One example of the command is depicted in FIG. 5 and described below.

A Cleanup Lock Table Entries command 500 includes, for instance, a message header 502 supplying various information (e.g., number of bytes of the message) used in getting the message control block (MCB) across the link from the processor to the coupling facility; a command code (CC) 504 indicating this is a command to cleanup a lock structure; a structure identifier (SID) 506 identifying the lock structure to be cleaned up; a lock request type (LRT) 508 indicating whether an exclusive lock, shared lock or both is to be cleaned up; and a user identifier (UID) 510 identifying the terminated user.

Returning to FIG. 4, after a CLTE command is issued on behalf of the surviving user, the command is processed by the coupling facility, as described herein, STEP 404. The command performs lock table entry cleanup internally. That is, each command scans a different portion of the lock table searching for entries indicating a lock held by the terminated user. When such an entry is found, the command releases the user's interest in that lock table entry in accordance with lock request type 508, as described further below. The command then continues with the scan process with the next lock table entry.

Upon completion of a CLTE command, XES makes a determination as to whether cleanup is complete, INQUIRY 406. This determination is made by checking a return code. If it is zero, cleanup is complete, and if it is one, cleanup is not complete. If cleanup is not complete, then processing continues at STEP 402. When processing is complete, XES marks the terminated user as cleaned up, and makes the connection to the lock structure available again for the terminated user.

Figure 6A:
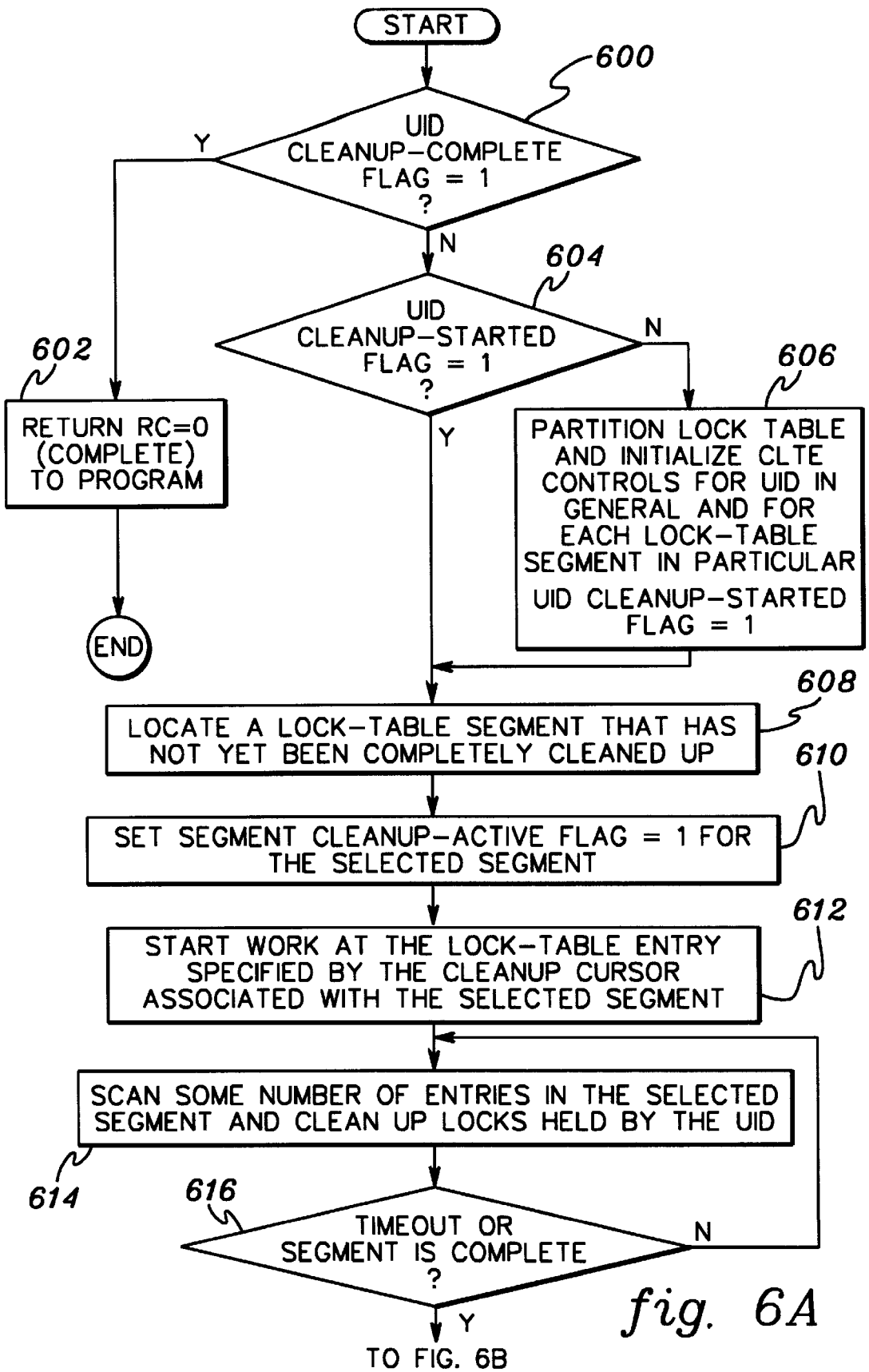
FIGS. 6a–6b depict one example of the logic associated with processing of the CLTE command of FIG. 5, in accordance with the principles of the present invention.
Figure 6B:
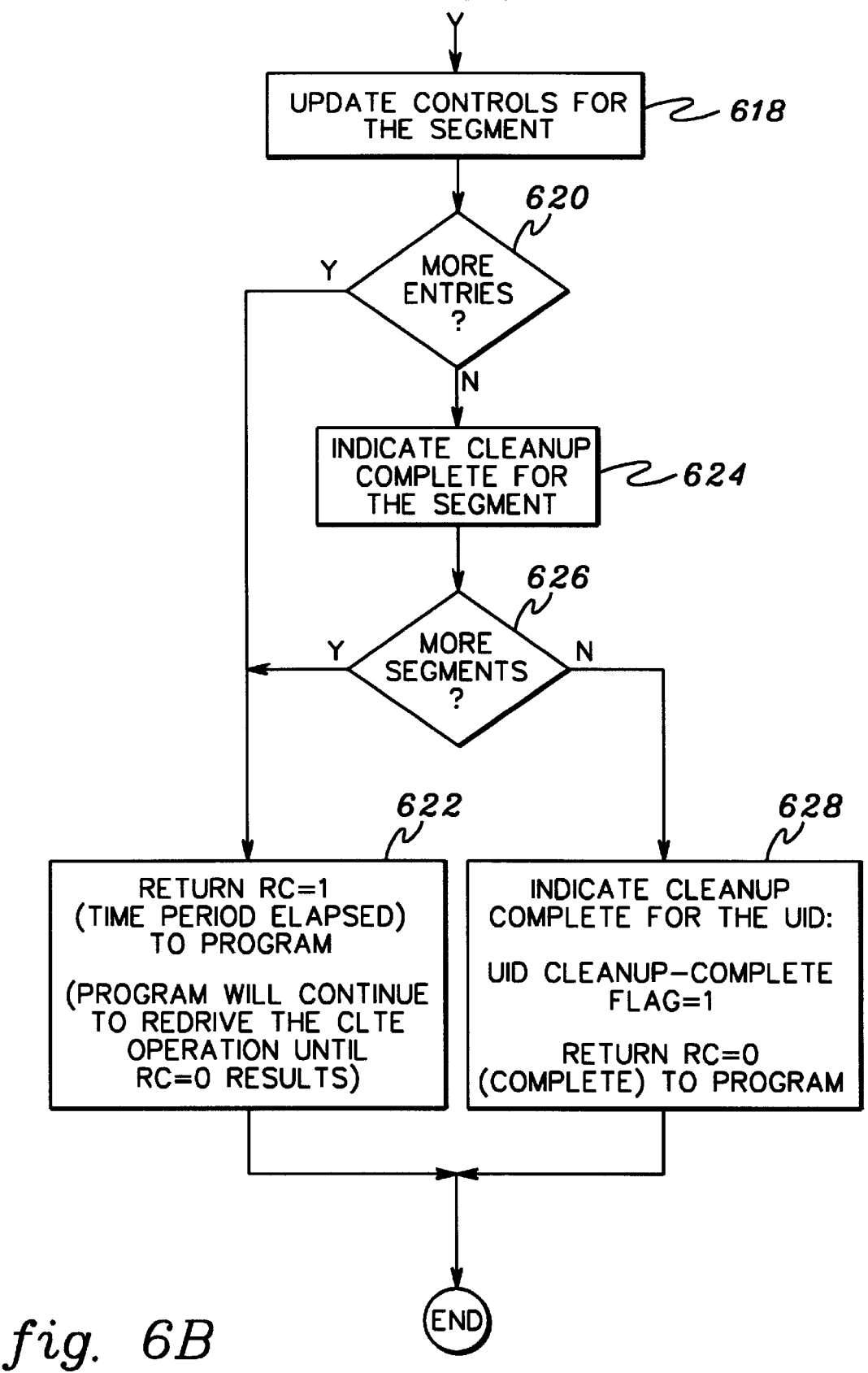

Processing of the CLTE command, which occurs at the coupling facility, is described in further detail with reference to FIGS. 6a–6b. Initially, a determination is made as to whether there are entries in one or more segments that need to be cleaned up, INQUIRY 600 (FIG. 6a). In one example, this determination is made by referencing a UID cleanup-complete flag located within a table maintained within the coupling facility. One embodiment of such a table is described with reference to FIG. 7.

Table 700, which is referenced during processing of a CLTE command, includes a plurality of controls for each possible user of the lock structure. In one example, there may be 32 users, and thus, 32 user identifiers (UIDs) 702 are included in the table. Each UID 702 has the following controls associated therewith: a latch 704, which, when acquired, provides serialization for the table; a cleanup-started flag 706, which indicates whether cleanup for the terminated user identified by the UID has begun, for any segment of the lock structure; a cleanup-complete flag 708, which indicates whether all of the segments of the lock structure have been cleaned-up for the terminated user (flags 706 and 708 are initialized to zero); and, a round-robin segment index 710, which indicates which segment is to be cleaned-up next. The round-robin segment index distributes processing evenly over all of the segments (e.g., over all 16 segments).

In addition to the above, for each user identifier of Table 700, there is a list of segments 712 of the partitioned lock structure. In one example, the lock structure is partitioned into 16 segments, and each segment 712 has the following three controls associated therewith: a cleanupactive flag 714, which indicates whether cleanup for that particular segment is active; a cleanup-complete flag 716, which indicates whether cleanup for that particular segment is complete; and a cleanup cursor 718, which indicates where cleanup is to begin or continue in that segment.

Returning to FIG. 6a, in order to determine whether clean-up is needed for a terminated user, UID cleanup-complete flag 708, which is associated with the UID of the terminated user, is referenced. If the flag is set to one, this indicates that cleanup is complete for the entire lock structure for that user. Thus, a return code of zero is returned to the program (e.g., XES) issuing the CLTE command, STEP 602. However, if the UID cleanup-complete flag is not equal to one, then a further determination is made as to whether cleanup has begun for the lock structure for the terminated user, INQUIRY 604. In one embodiment, this determination is made by referencing UID cleanup-started flag 706 of the terminated user.

When the UID cleanup-started flag is equal to zero, this indicates that no CLTE operation has been initiated for the terminated user. Thus, the CLTE command partitions the lock structure into a plurality of segments, STEP 606. In particular, the latch for the terminated user is acquired, and the command assigns to each of the cleanup cursors, for the terminated user, a different part of the lock structure. This is accomplished by using an array, such as the one depicted in FIG. 8a. In one example, an array 800 includes a list of the segments 802 of the partitioned lock structure, and a starting lock table entry number 804 for each of the segments. For instance, if a lock table has 1,000,000 entries and it is partitioned into 16 segments, then Segment 1 begins at entry 1; Segment 2 at entry 62,501, etc. This table is set-up, for instance, during allocation of the lock structure.

A further array, array 806 (FIG. 8b), is also set-up at structure allocation. Array 806 defines, for each segment 808, the ending lock table entry number (LTEN) 810 for that segment. For instance, Segment 1 has an ending LTEN of 62,500; Segment 2 has an ending LTEN of 125,000, etc.

Returning to FIG. 6a, in addition to initializing each of cleanup cursors 718, the following controls are also initialized: UID cleanup-started flag 706 is set to one; UID round-robin segment index 710 is set to point to the first segment; cleanup-active flag 714 for each segment is set to zero; and each of the 16 segment cleanup-complete flags 716 is set to zero.

Figure 7:
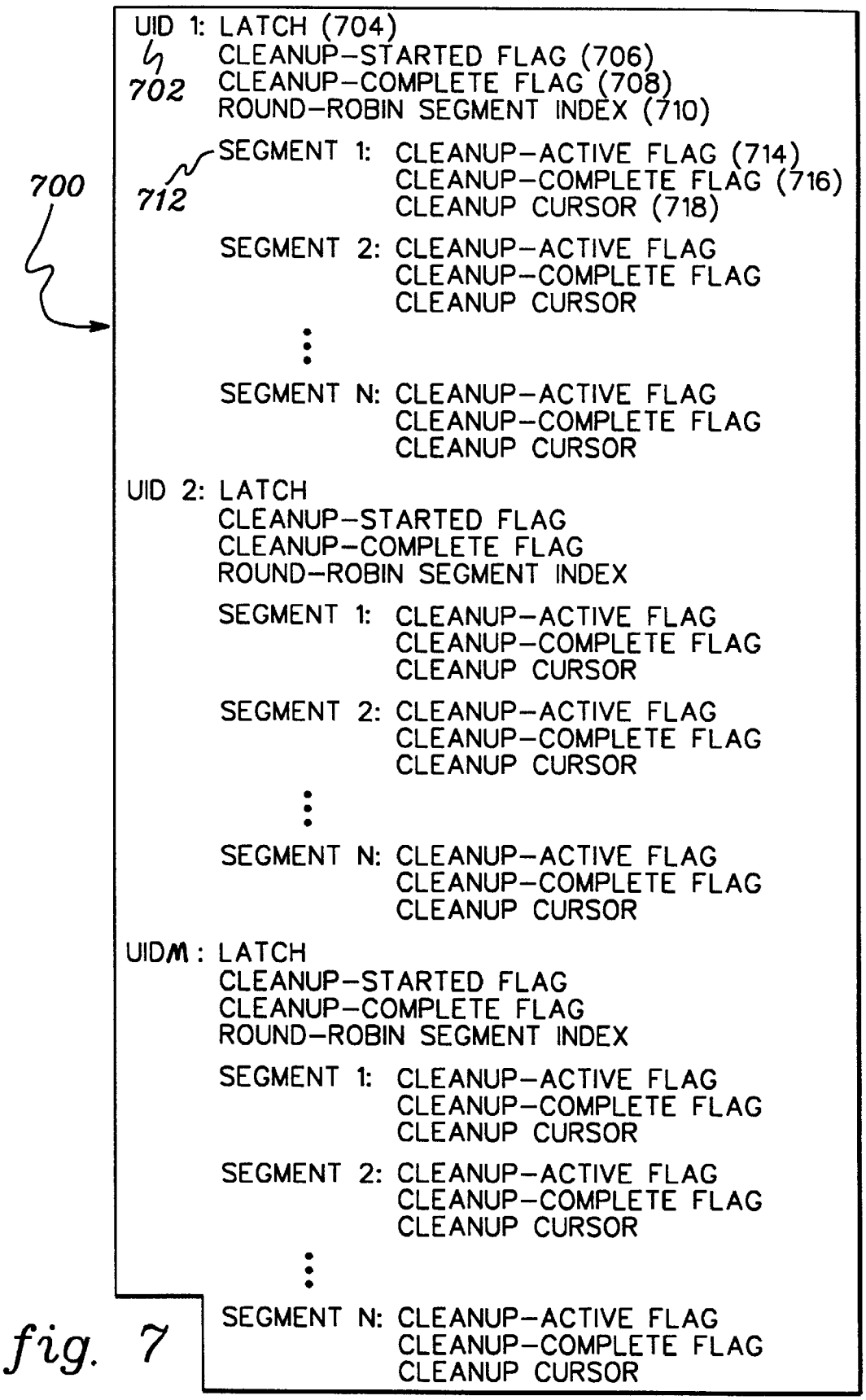
FIG. 7 depicts one embodiment of a table used during cleanup processing of the present invention.

After partitioning the lock structure and initializing the controls, the CLTE command locates a segment to be cleaned up, STEP 608. Alternatively, if this is not the first CLTE command to be processed for the terminated user, indicating that the lock structure has previously been partitioned, then the CLTE command locates a segment to be cleaned up, STEP 608. In one example, the command uses round-robin segment index 710 of the terminated user to locate the segment to be scanned. Specifically, the value of that index (e.g., 1–16) indicates where to start looking for a segment to be processed. The segment controls of FIG. 7 are scanned, starting at that location, until a segment is found for which cleanup-active flag 714 is zero and cleanup-complete flag 716 is zero. After a segment is located, the round-robin segment index is set to the segment following the selected segment.

When a segment is selected, segment cleanup-active flag 714 is set to one for the selected segment, and the UID latch is released, STEP 610. Thereafter, cleanup processing of that segment begins at the entry designated by the cleanup cursor associated with the selected segment, STEP 612. In particular, entries of the segment are scanned looking for locks held by the terminated user that may need to be cleaned up, STEP 614. One embodiment for cleaning up locks is described with reference to FIG. 9.

Figure 9:
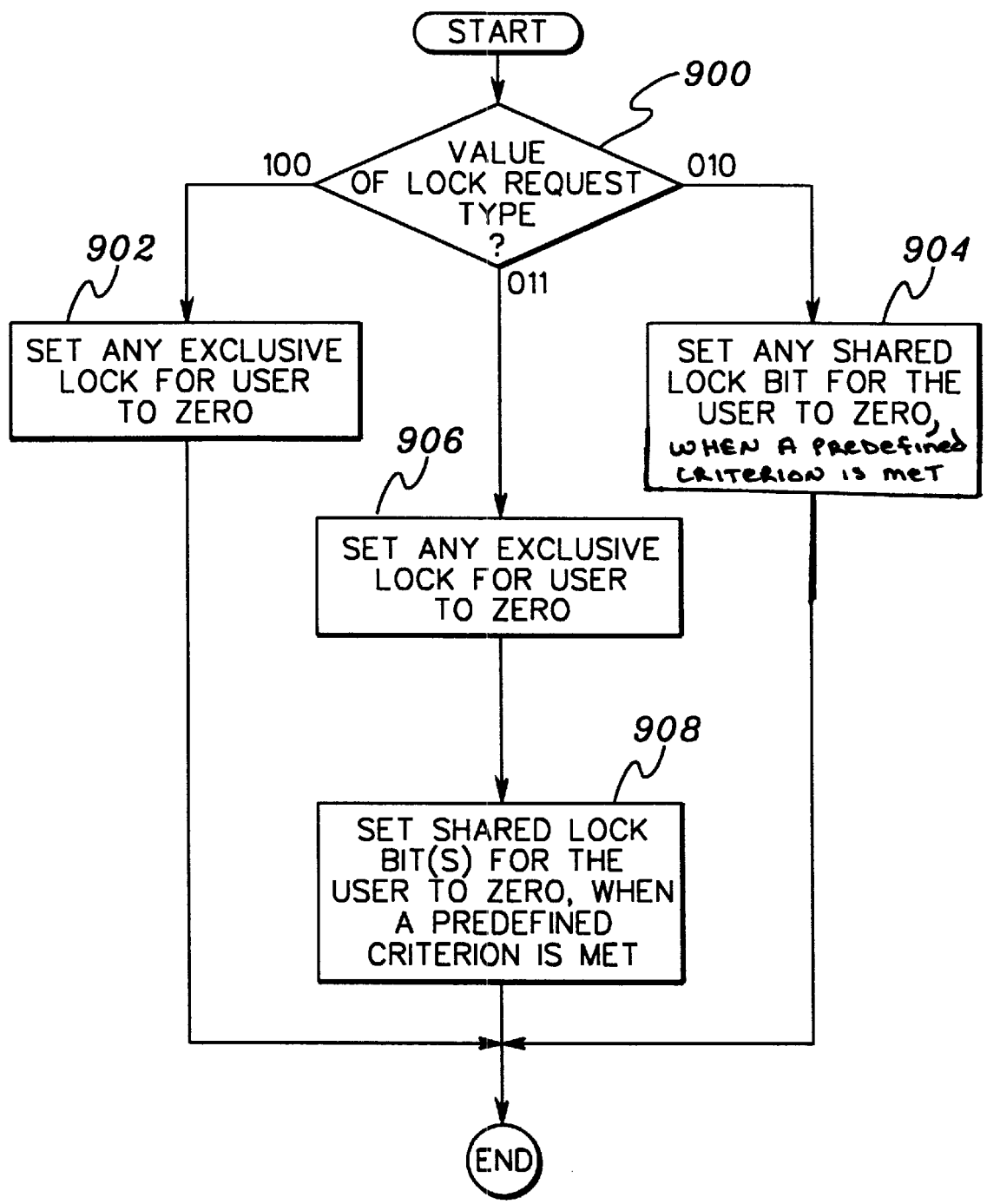
FIG. 9 depicts one embodiment of the logic associated with cleaning up locks of a lock structure, in accordance with the principles of the present invention.

Referring to FIG. 9, initially, a determination is made as to the value of lock request type 508 (FIG. 5) provided by the CLTE command, INQUIRY 900. If the request type is, for instance, 100, this indicates that only the exclusive locks held by the terminated user are to be cleaned up. Thus, if an exclusive lock is present for user identifier 510 in any scanned entry, then the exclusive lock is set to zero, STEP 902.

When the value of the lock request type is, for instance, 010, this indicates that only the shared locks held by the terminated user are to be freed. Thus, if there is a shared bit in any scanned entry corresponding to the user identified on the CLTE command and the exclusive lock of that entry is zero (predefined criterion), then the shared bit is set to zero, STEP 904.

On the other hand, if the value of the lock request type is, for instance, 011, indicating both exclusive and shared locks are to be cleaned up, then if there is an exclusive lock present in any scanned entry for user identifier 510, the exclusive lock is set to zero, STEP 906. Further, for any scanned entry in which there is an exclusive lock for the terminated user or the exclusive lock is equal to zero, and there is a shared bit in that entry corresponding to the terminated user, that bit is also set to zero, STEP 908.

Returning to FIG. 6a, the above processing is continued until a number of the entries (e.g., 64) of the located segment are cleaned up. That is, each CLTE command runs for a predefined amount of time (e.g., 10 milliseconds), and during that time slice, some number of entries are scanned and cleaned up. When the predefined amount of time is exceeded, the command times out. In another example, the command may be forced to time-out before the predefined amount of time, if other commands with a higher priority are waiting to execute.

Thus, a determination is made as to whether the CLTE command has timed-out or whether the segment is complete, INQUIRY 616. If the CLTE command has not timed-out and if the segment is not complete, then processing continues with STEP 614. However, should the command time-out or if the segment is complete, INQUIRY 616, then some of the controls associated with the segment are updated, STEP 618 (FIG. 6b). For example, at the end of the time slice, the UID latch for the terminated user is reacquired, and cleanup-active flag 714 for the selected segment is set to zero. Additionally, cleanup cursor 718 is set to the lock table entry number of the next lock table entry to be processed.

Figures 8A, 8B:
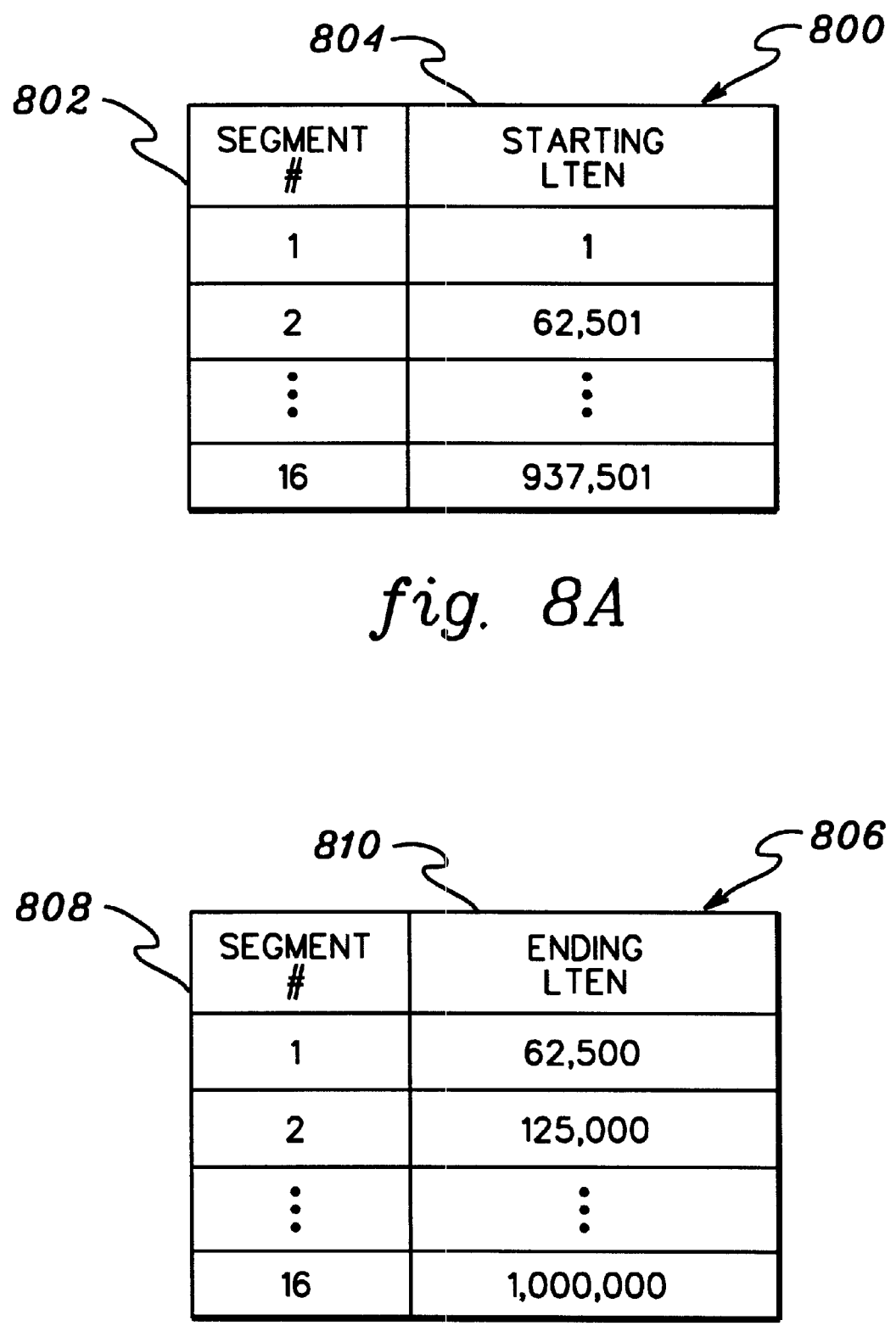

Thereafter, a determination is made as to whether there are more entries within the segment to be cleaned up, INQUIRY 620. This determination is made by, for instance, comparing the value of the cleanup cursor of the segment with the ending LTEN of the segment, as indicated in FIG. 8b. If the ending LTEN is greater than the value of the cleanup cursor, then there are more entries to be scanned. Thus, a response code of 1, indicating the time period has elapsed, is returned to the program, STEP 622. Thereafter, the program redrives the CLTE operation, STEP 622, and processing continues with STEP 600, as described above. The program continues to redrive the CLTE operation until it receives a return code of zero.

Returning to INQUIRY 620, when there are no more entries to process for the segment, then the segment is marked as complete in table 700, STEP 624. In particular, cleanup-complete flag 716 is set to one.

Subsequently, a further determination is made as to whether there are any more segments to be cleaned up, INQUIRY 626. This determination is made by scanning all of the segments' cleanup-active flags and cleanup-complete flags, while the latch is held. If one or more of segment cleanup-active flags 714 is one, or if one or more of segment cleanup-complete flags 716 is zero, then the UID cleanup complete flag remains equal to zero, and processing continues with STEP 622, as described above. However, when all of the segment cleanup-active flags are zero and all of the segment cleanup-complete flags are one, then processing of the lock structure is complete and an indication of such is provided, STEP 628. In one example, UID cleanup-complete flag 708 is set to one, and a response code of zero (indicating completion) is returned to the program. Once the UID cleanup-complete flag has been set to one, any further redrives of the CLTE operation for that UID will end immediately with a response code of zero.

At the time the user is reattached to the lock structure, UID cleanup-complete flag 708 is reinitialized to zero. This allows the clean-up operation to be performed again for that user, if necessary.

In accordance with the principles of the present invention, a plurality of CLTE commands are executed simultaneously. Thus, a plurality of segments of the lock structure are processed concurrently or in parallel. This advantageously increases the processing speed of the cleanup procedure.

As described above, only the first CLTE command issued for the lock structure for a terminated user partitions the lock structure into the plurality of segments. Thus, any other CLTE commands issued for that user are considered redriven commands that do not partition the lock structure. Any time a CLTE command times-out, the command is redriven, as long as there are more entries to be cleaned up.

Each CLTE command of the present invention takes as input a user identifier, which identifies the user that has terminated and is to be cleaned up. Each CLTE command performs lock table entry cleanup internally. That is, it scans a portion of the lock table searching for entries indicating a lock held by the terminated user, and when such an entry is found, it automatically frees the user's lock(s) for that entry, as indicated by the LRT. It then continues the scan process with the next lock table entry. The CLTE command thus avoids halting on every matching lock table entry, which optimizes the cleanup process by substantially reducing the number of coupling facility accesses required.

The CLTE command of the present invention avoids the overhead associated with each surviving user redundantly scanning the lock table entries. XES drives the cleanup process from each surviving system. However, the CLTE command internally subdivides the lock table into a number of segments, each of which is scanned and cleaned up by, for instance, one CLTE command for a given time slice. Once a given segment has had all of its lock table entries scanned and cleaned up as needed, the segment is considered done and is not scanned by any subsequent CLTE command. When all the segments are done, the CLTE command (and any subsequent CLTE commands to perform cleanup for the user) returns a return code which indicates that cleanup for the user is complete. Multiple CLTE commands may run in the coupling facility concurrently, each working in parallel on cleaning up different segments of the lock table for the same (or a different) terminated user.

In addition to the above, each of the CLTE commands may spawn additional background processes, which run in the coupling facility on any available coupling facility processors. These background processes perform cleanup in the same manner as described above. In particular, these background processes acquire lock table segments that need to be cleaned up, scan them performing cleanup as needed, and then indicate that a segment is done. These background processes allow the cleanup process to be performed with a high degree of parallelism (gated only by the number of available processors in the coupling facility), regardless of how many surviving users may be driving the CLTE commands to the coupling facility. If the cleanup process running under one of these background processes happens to cleanup the last segment needing cleanup, then any subsequent CLTE commands to perform cleanup for the user indicate that cleanup for the terminated user is complete.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of processing lock structures, said method comprising:

partitioning a lock structure into a plurality of segments, said plurality of segments comprising a plurality of entries, and said plurality of entries comprising a plurality of locks, wherein said lock structure is located within a coupling facility and shared by one or more processors coupled to said coupling facility, the one or more processors execute one or more operating systems, and wherein said coupling facility has processing and storage capabilities but lacks an operating system; and processing multiple segments of said plurality of segments in parallel.

2. The method of claim 1, wherein said partitioning is performed by a command issued on behalf of a user of one of said one or more processors, said command being executed within said coupling facility.

3. The method of claim 2, wherein said command issued on behalf of said user is further used to process at least a portion of one or more segments of said multiple segments.

4. A method of processing lock structures, said method comprising:

partitioning a lock structure into a plurality of segments, said plurality of segments comprising a plurality of entries, and said plurality of entries comprising a plurality of locks; and processing multiple segments of said plurality of segments in parallel, wherein said processing, for a segment of said multiple segments, comprises:

scanning entries of said segment to determine whether any locks are held by a terminated user of said lock structure; and cleaning up one or more of said locks determined to be held by said terminated user.

5. The method of claim 4, wherein said cleaning up comprises at least one of the following:

setting one or more exclusive locks held for said terminated user to zero; and setting one or more shared locks corresponding to said terminated user to zero.

6. The method of claim 4, further comprising using one command to perform said scanning and said cleaning up.

7. The method of claim 6, further comprising:

determining whether said command has timed-out during said scanning or said cleaning up; and redriving said command, if said command has timed-out and entries of said segment or other segments of said lock structure need to be cleaned up.

8. The method of claim 6, wherein said command is executed by a coupling facility, said coupling facility comprising said lock structure, which is shared by one or more processors coupled to said coupling facility.

9. The method of claim 4, further comprising processing any remaining segments of said plurality of segments.

10. The method of claim 4, wherein said scanning and said cleaning up are performed for each segment of said multiple segments.

11. A method of processing lock structures, said method comprising:

partitioning a lock structure into a plurality of segments, said lock structure being located within a coupling facility and shared by one or more processors coupled to said coupling facility, the one or more processors executing one or more operating systems;

scanning one or more segments of said plurality of segments to locate at least one lock of said lock structure to be cleaned up, said scanning using one or more cleanup commands; and cleaning up said at least one lock, said cleaning up being performed by the same one or more cleanup commands that located said at least one lock during said scanning, wherein said one or more cleanup commands are initiated by at least one processor of said one or more processors and executed by said coupling facility, said coupling facility having processing and storage capabilities and being external to said one or more processors executing said one or more operating systems.

12. The method of claim 11, wherein said scanning comprises scanning multiple segments of said plurality of segments in parallel.

13. A method of processing lock structures, said method comprising:

scanning one or more segments of a lock structure partitioned into a plurality of segments to determine whether one or more locks of said lock structure is held by a terminated user; and determining whether any of said one or more locks is to be cleaned up, when said scanning determines said one or more locks is held by said terminated user.

14. The method of claim 13, further comprising cleaning up at least one lock determined to need to be cleaned up.

15. The method of claim 14, wherein said scanning, said determining and said cleaning up are performed by one command.

16. The method of claim 13, wherein said scanning comprises scanning multiple segments of said plurality of segments in parallel.

* * * * *